United States Patent
Fujiwara et al.

(10) Patent No.: US 7,540,539 B2
(45) Date of Patent: Jun. 2, 2009

(54) PIPE JOINT

(75) Inventors: Yasushi Fujiwara, Tokyo (JP); Takuji Matsuki, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 0 days.

(21) Appl. No.: 11/997,643

(22) PCT Filed: Jul. 28, 2006

(86) PCT No.: PCT/JP2006/315011

§ 371 (c)(1),
(2), (4) Date: Feb. 1, 2008

(87) PCT Pub. No.: WO2007/015434

PCT Pub. Date: Feb. 8, 2007

(65) Prior Publication Data

US 2008/0258459 A1    Oct. 23, 2008

(30) Foreign Application Priority Data

Aug. 3, 2005  (JP) .............................. 2005-225712

(51) Int. Cl.
*F16L 41/00*     (2006.01)
(52) U.S. Cl. .................. 285/205; 285/206; 285/208
(58) Field of Classification Search ................ 285/205, 285/206, 207, 208
See application file for complete search history.

(56) References Cited

U.S. PATENT DOCUMENTS

| 5,118,141 | A | * | 6/1992 | Miyashita | .................. 285/336 |
| 5,163,716 | A | * | 11/1992 | Bolton et al. | ............. 285/142.1 |
| 5,174,612 | A | * | 12/1992 | Schnell | ....................... 285/208 |
| 5,477,919 | A | * | 12/1995 | Karube | ........................ 165/176 |
| 6,386,593 | B1 | * | 5/2002 | Slais et al. | ................... 285/205 |
| 6,893,052 | B2 | * | 5/2005 | Wildermuth et al. | ........ 285/205 |
| 6,908,117 | B1 | * | 6/2005 | Pickett et al. | ............... 285/205 |
| 6,969,094 | B2 | * | 11/2005 | Frohling et al. | ............. 285/205 |
| 7,237,807 | B2 | * | 7/2007 | Hiyama et al. | .............. 285/208 |
| 2003/0080554 | A1 | * | 5/2003 | Schroeder et al. | ........... 285/205 |

FOREIGN PATENT DOCUMENTS

| JP | 59-185486 | 12/1984 |
| JP | 62-177995 | 11/1987 |
| JP | 2005-147320 | 6/2005 |

* cited by examiner

*Primary Examiner*—David E Bochna
(74) *Attorney, Agent, or Firm*—Arent Fox LLP.

(57) ABSTRACT

A pipe joint 1 comprises a fitting 10 connected with a hose 2, a flange 20 pressingly holding the fitting 10 inserted into a through hole 21 toward a block 3, a bolt 30 for fixing tightly the flange 20 to the block 3, a metal seal 40 having "C" cross section so as to seal a joined portion of a communication passage 11 and a connection opening 3*a* externally, and a first and a second O-rings 50, 60 so as to seal a contact portion of the fitting 10 and the block 3. A projecting portion 24 is formed on a lower face 23 of the flange 20, the projection portion 24 is formed at an area opposite to an area where the insertion hole 21 is formed with respect to a center axis of the through hole 21, the project portion 24 projects from other portion of the flange towards the block 3. A tip of the fitting 10 inserted into the through hole 21 projects towards the block 3 from the lower face 23 of the flange 20.

3 Claims, 12 Drawing Sheets

PIPE JOINT

CROSS-REFERENCE TO RELATED APPLICATION

This application is a National Stage entry of International Application No. PCT/JP2006/315011, filed Jul. 28, 2006, the entire specification claims and drawings of which are incorporated herewith by reference.

FIELD OF THE INVENTION

This invention relates to a pipe joint preferably used for connecting a hose to equipments such as compressors and the like in a car air-conditioner and the like.

BACKGROUND OF THE INVENTION

As a conventional pipe joint for a compressor of a car air-conditioner and the like, as shown in FIG. 12, it is known that a pipe joint comprising a connected hose 2 for supplying refrigerant, and a flange 20, having a communication passage 26 communicates through into the hose 2, is fixedly joined to a block 3 wherein the flange 20 is fixedly joined to the block of a compressor by using one bolt 30.

In a pipe joint 1' of this kind, a rubber made O-ring 70 is provided at an outer circumference of a protrusion portion 25 of the flange 20' which is joined to a connection opening 3a of the block 3. By the O-ring 70, a connecting portion of the communication passage 26 and the connection opening 3a is sealed to an external portion.

In the meantime, in recent years, as refrigerant for a car air-conditioner, carbon dioxide gas ($CO_2$) is noted instead of chlorofluorocarbon gas. In case that the carbon dioxide gas is used as refrigerant, compared with chlorofluorocarbon gas, a pressure of gas flowing in the pipe joint 1' becomes 10 times higher or so, there is a problem that the gas leaks through the O-ring 70.

Consequently, as a method for eliminating such the gas leakage, it is considered to use a metal seal instead of the O-ring. However, in case that the metal seal is used, for fixing the metal seal, it is necessary to press in parallel by a large tightening force using more than two bolts which deteriorates fixing operation. As a result, a number of man-hour increases compared from the conventionally known pipe joint 1'.

DISCLOSURE OF THE INVENTION

Problems to be Solved by the Invention

The present invention is objected to provide a pipe joint which is available to prevent leakage of high-pressure gas and has high fixing operability.

Means for Solving the Problem

The present invention is made to solve the above mentioned technical problem, and means for solving the problem are constituted as follows.

A pipe joint of the present invention is that a pipe joint for connecting a pipe with a connection opening of a body to be connected comprising;

a fitting connected to an end portion of the pipe and provided with a communication passage communicating into the pipe;

a flange having a through hole with which said fitting is available to be inserted, and flange pressingly holding said fitting inserted into said through hole towards said body;

a tightening means for fixing tightly said flange to said body;

a metal seal provided between said fitting and said body so as to seal a joined portion of said communication passage and said connection opening externally, and;

an O-ring for sealing a connecting portion of said fitting and said body externally; wherein, said metal seal is composed of a ring member having "C" shaped cross section, which includes an opening groove in an inner circumference;

said O-ring comprises a first O-ring provided between said fitting and said flange, and a second O-ring provided between said flange and said body;

an insertion opening is formed in said flange for inserting said tightening means;

a projecting portion is formed on a face of said flange which is opposed to said body, said projecting portion is formed at an area opposite to an area where said insertion opening is formed with respect to a center axis of said insertion opening, said projection portion projects from other portion of said flange towards said body;

a tip of said fitting inserted into said through hole projects towards said body from said face of said flange.

In the present invention, initially, the metal seal is provided between the fitting and the body so as to seal externally the joint portion of the connection opening of the body and the communication passage of the pipe joint. Thereby, leakage of the high pressure gas such as carbon dioxide gas and the like through the seal portion can be prevented.

Also, in the present invention, the metal seal is composed of a ring-member having C-shape cross-section. Thereby, a tightening force is accumulated as a resilient repulsion force, the connection portion can be sealed certainly with a small tightening force even using the metal seal. Also, since the tightening force is small, a damage such as an impression on a sealing face of the body given by the metal seal can be prevented.

Further, in the present invention, the fitting to which a piping is connected, and the flange to be connected with the body are composed of different members. Thereby, the piping and the body composed by different metallic materials can easily be connected, since the fitting can be composed by the same material with the piping and the flange can be composed by the same metallic material with the body. Furthermore, since a direction of the piping can be adjusted after a temporary joint of the fitting with the body, an operating ability is increased. For example, it is particularly advantageous when the piping is rigid and even vended as L-shape.

Also, in the present invention, in a face of the flange opposed to said body, a projecting portion is formed, said projecting portion is formed at an area opposite to an area where said insertion opening is formed with respect to a center axis of an insertion opening, and the projection portion projects from other portion of said flange towards said body. Thereby, when fastening the flange with the body by the tightening means, a tightening force is applied to the projected portion in a concentrated manner. The tightening force applied to the projected portion is also applied to the tip of the fitting in a concentrated manner by the principle of leverage wherein a fulcrum is the tightening means. Thus, even if the flange is fixed to the body by one bolt, the metal seal can be pressurized in parallel and an excellent workability can be maintained.

Further, in the present invention, a first O-ring is provided between the fitting and the flange, and a second O-ring is provided between the flange and the body, for sealing externally a connection portion of the fitting and the body.

Thereby, in case that the fitting and the body are composed by different metal materials, intrusion of water such as rainwater and the like from an outside can be prevented and an occurrence of the galvanic corrosion (bimetallic corrosion) between the fitting and the body can be prevented.

Preferably, in the pipe joint of the present invention, said metal seal is tin plated on its surface. Thereby, a damage such as an impression given to the seal face of the body according to fastening the metal seal can be prevented, since the surface of the metal seal can be softened to a moderate degree.

Preferably, in the pipe joint of the present invention, a holding portion having a convex or a concave shape available to hold the metal seal is formed at a tip of said fitting.

Thereby, the pipe joint can be equipped to the body with a condition of holding the metal seal with the pipe joint, and since a release of the metal seal during an installation working can be prevented, workability is increased. Also, in the case of releasing the pipe joint from the body, since the pipe joint can be released with a holding condition of the metal seal with the pipe joint, workability is increased too.

According to the present invention, it is possible to prevent permeation leakage of high pressure gas, and a pipe joint with high workability can be provided.

BEST MODE FOR CARRYING THE INVENTION

Below, embodiments of the present invention will be described based on drawings.

Figure 1:
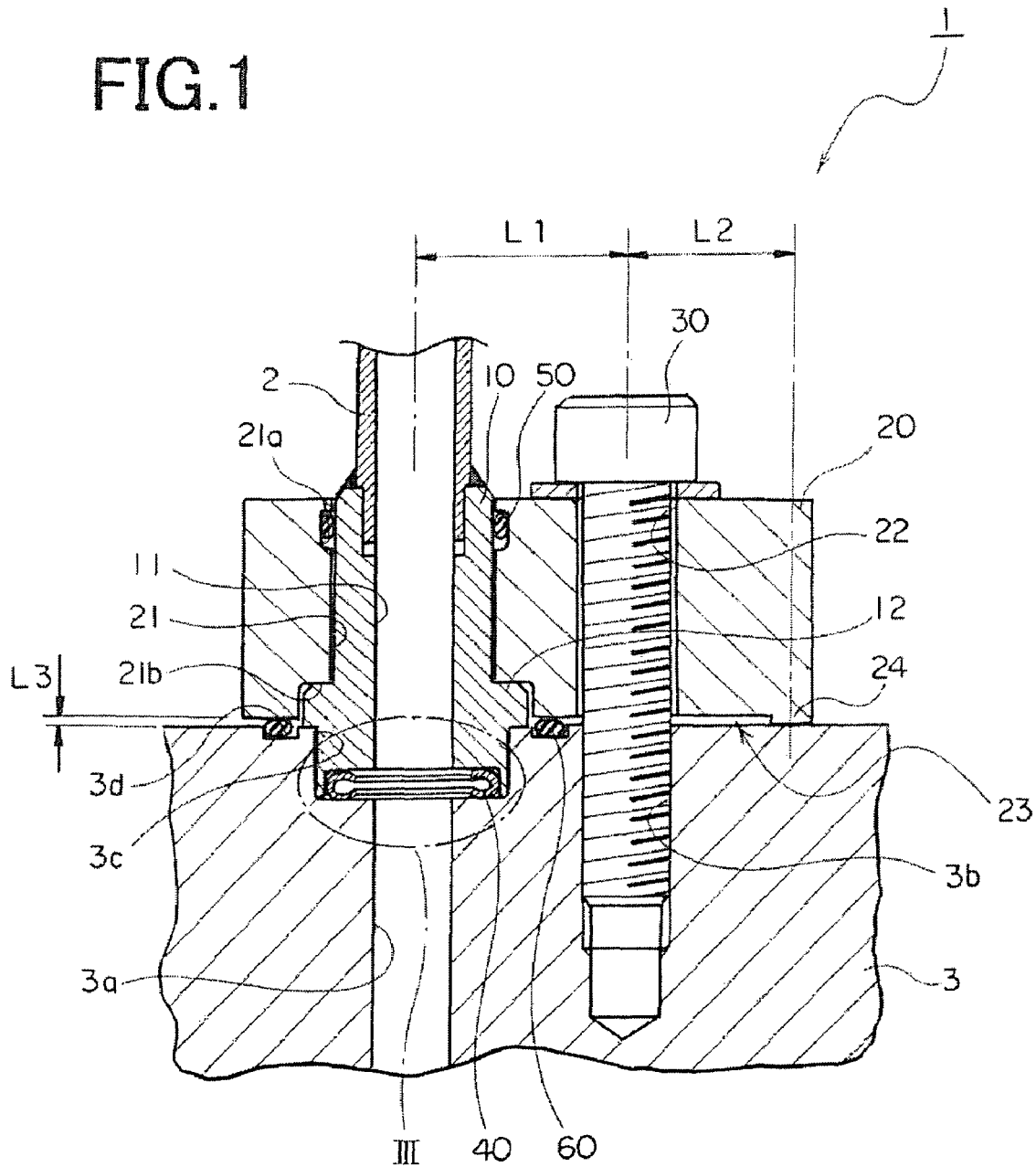
FIG. 1 is a vertical cross sectional view showing a pipe joint according to a first embodiment of the present invention.

A pipe joint 1 according to a first embodiment of the present invention shown in FIG. 1 is used for connecting a hose 2 for supplying a refrigerant with a connection opening 3a formed on a block 3 provided with a compressor of a car air-conditioner. The block 3 is composed of metallic materials such as aluminum and the like. The hose 2 is composed of metallic materials such as stain-less steel and the like. Therefore, the block 3 and the hose 2 are composed of different metallic materials. Although it is not particularly shown in drawings, the block 3 is fixed to the compressor body with using a bolt and the like.

Figure 2:
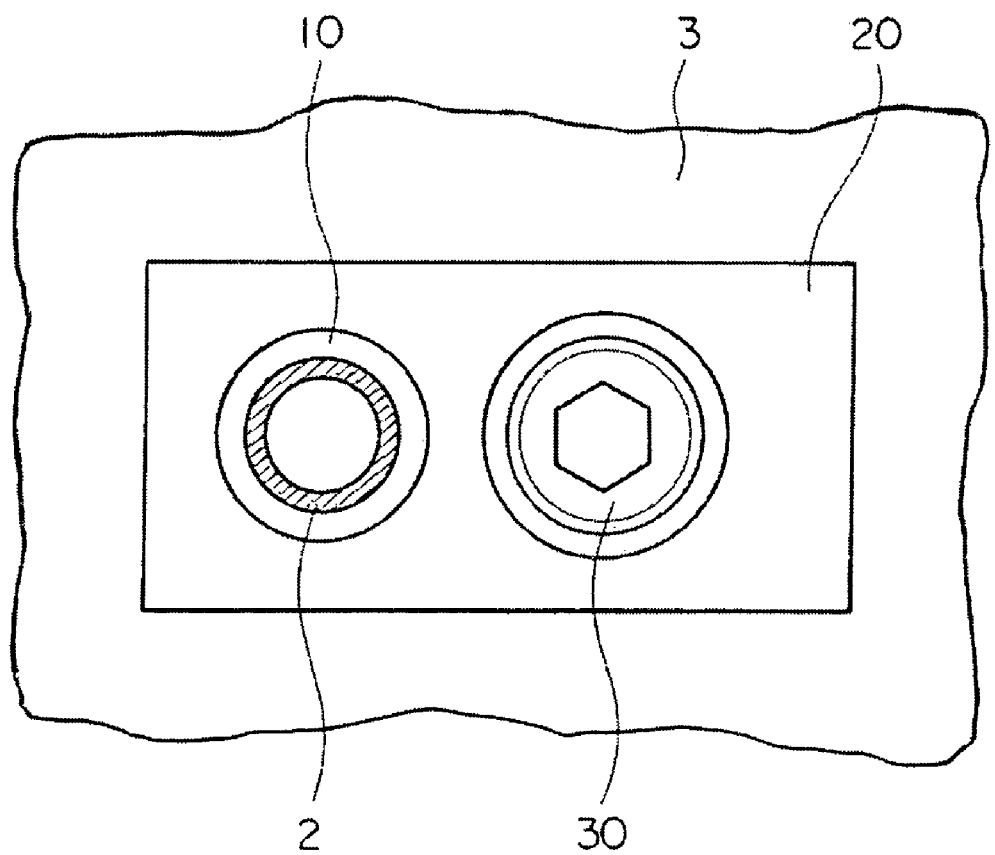
FIG. 2 is a plane view of the pipe joint shown in FIG. 1.

As shown in FIG. 1 and FIG. 2, the pipe joint 1 comprises a fitting 10 connected to an end portion of a hose 2 having a communication passage 11 which communicates into the hose 2, a flange 20 having a through hole 21 with which the fitting 10 is available to be inserted and pressingly holding the fitting 10 inserted into the through hole 21 towards a block 3, a bolt 30 for fixing tightly the flange 20 to the block 3, a metal seal 40 provided between the fitting 10 and the block 3 so as to seal a joined portion of said communication passage 11 and a connection opening 3a externally, and a first and a second O-rings 50, 60 for sealing externally a connecting portion of the fitting 10 and the block 3.

The fitting 10 is an about cylindrical body composed of metal materials such as stainless-steel and the like, and is composed of similar metal materials which constitute the hose 2. At one end portion of the fitting 10 (an upper side end portion in FIG. 1), an end portion of the hose 2 is connected by means, such as welding, brazing and the like, and the communication passage 11 penetrating into the fitting 10 communicates into the hose 2. By composing the fitting 10 with similar metal materials with the hose 2, these can easily be joined.

At an outer circumference of the other end portion of the fitting 10 (a lower side end portion in FIG. 1), a gap portion 12 having a convex shape constituted by an enlarged outer diameter of the fitting 10 is formed. When the fitting 10 is inserted into the through hole 21 of the flange 20, the flange 20 is available to press the fitting 10 toward the block 3 by the convex shape gap portion 12 which is latched at a concave shape gap portion 21b formed on the through hole 21.

Figure 3:
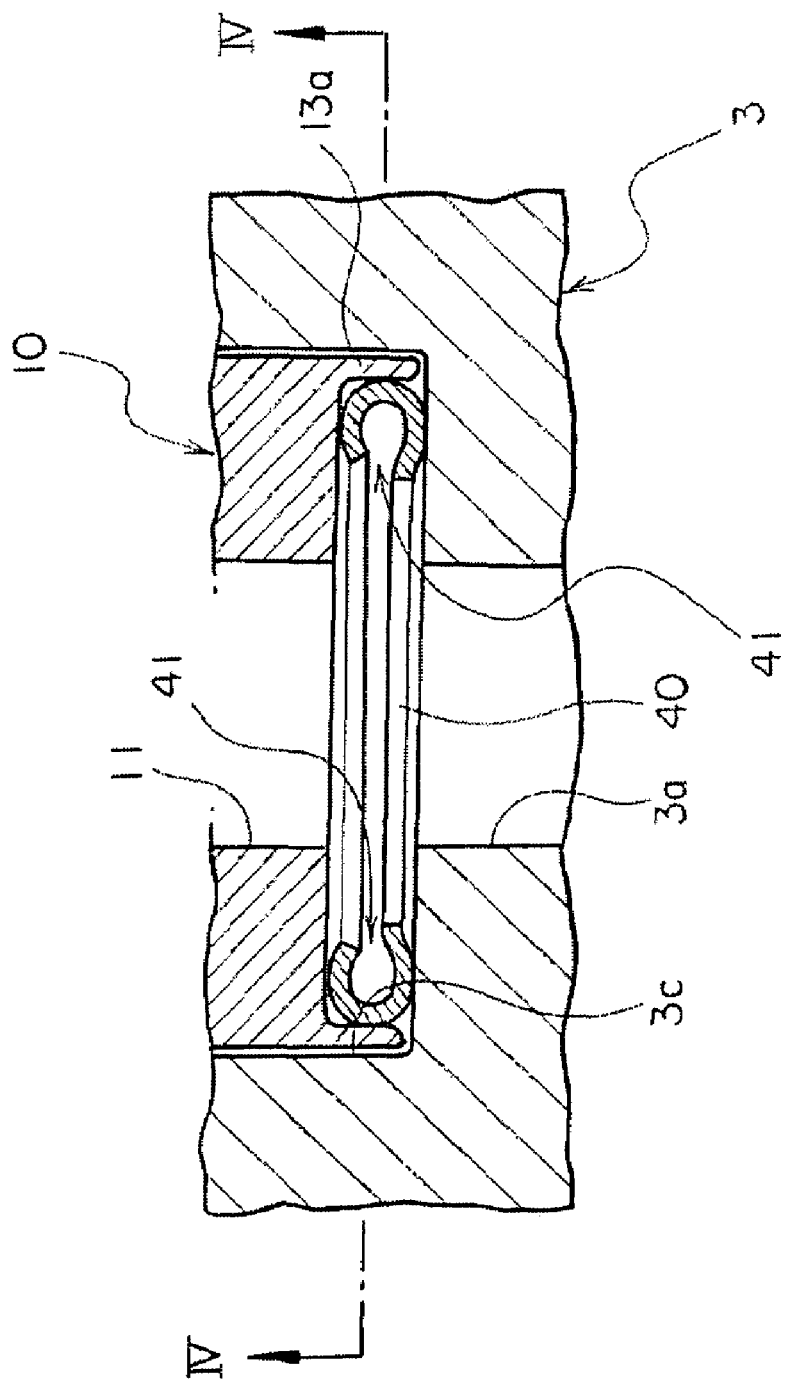
FIG. 3 is an enlarged cross sectional view of a portion III of FIG. 1.
Figure 4:
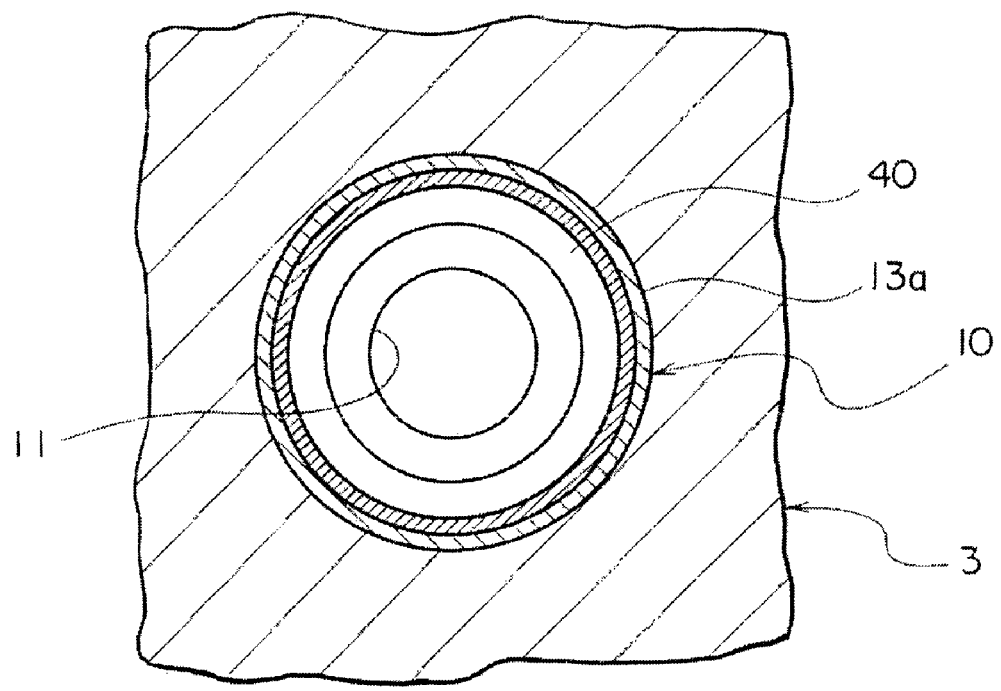
FIG. 4 is a cross sectional view along a line IV-IV of FIG. 3.

Further, at a tip of the fitting 10, as shown in FIG. 3 and FIG. 4, a holding portion 13a, having an outer circumference thereof only is circularity projected toward the block 3, is formed. By pressingly inserting the metal seal 40 into the holding portion 13a having concave shape, the metal seal 40 can be held by the fitting 10. Thereby, since the pipe joint 1 can be attached with the block 3 with a condition of maintaining the metal seal 40 with the fitting 10, workability is increased. Also, when maintenance and the like is required, because the pipe joint can be detached from the block 3 with a condition of maintaining the fitting 10 with the metal seal 40, workability can be increased.

The flange 20 is, as shown in FIG. 1 and FIG. 2, is an about rectangular parallel piped body composed of metal materials such as aluminum and the like which are metal materials similar with the block 3. By composing the flange 20 and the block 3 with similar metal materials, the galvanic corrosion occurred by intrusion of water such as rainwater and the like can be prevented.

In this flange 20, the through hole 21 for inserting the fitting 10 and an insertion opening 22 for inserting the bolt 30 are formed.

The through hole 21 of the flange 20 has a diameter to which the fitting 10 can be inserted so as to penetrate from one face (a lower face in FIG. 1) to an opposite face (an upper face in FIG. 1) of the flange 20. A gap portion 21b having concave shape composed by an enlarged inner diameter of the through hole 21 is formed at one end portion of the through hole 21 (an lower end in FIG. 1). As stated above, by the convex shape gap portion 12 of the fitting 10 latched at the concave shape gap portion 21b, the fitting 10 is available to be pressed toward the block 3 by the flange 20.

Also, at an inner circumference face of the other end portion of the through hole 21 (an upper side end portion in FIG.

1), an annular groove 21a for inserting the first O-ring 50 is formed. By the first O-ring 50 inserted to the annular groove 21a that seals between the fitting 10 and the flange 20, the intrusion of water such as rainwater and the like between the fitting 10 and the block 3, which are composed by different materials, can be prevented.

Figure 5:
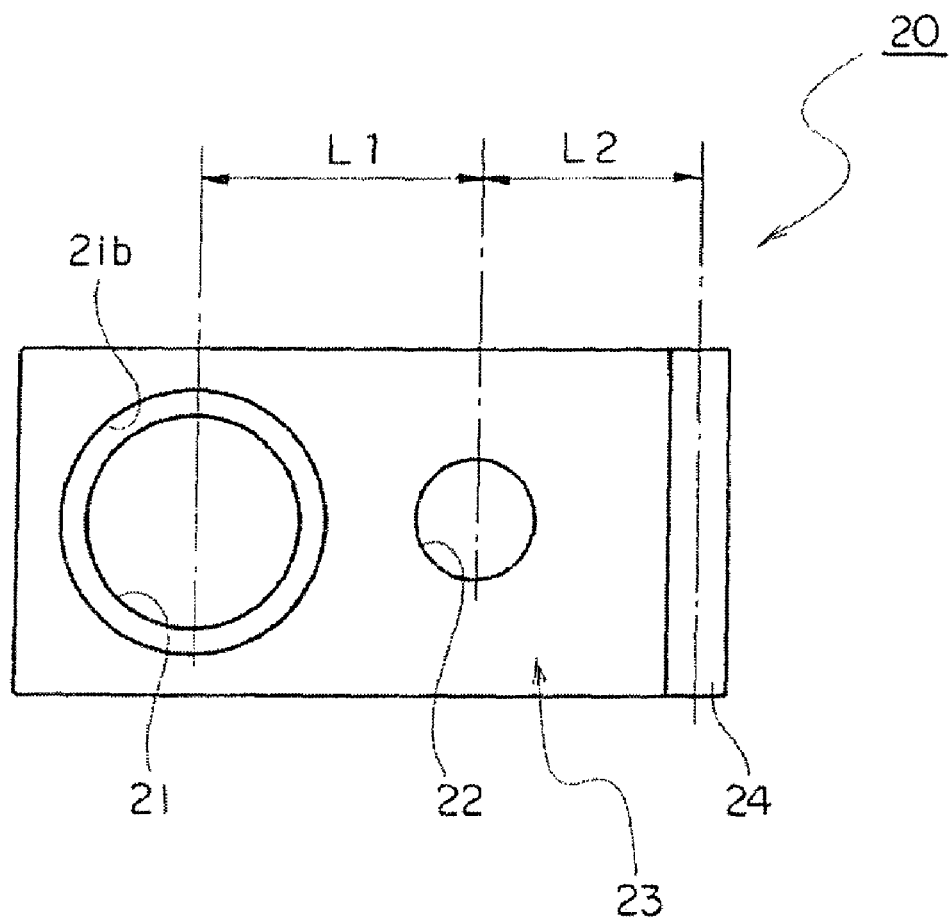
FIG. 5 is a bottom view of a flange used for the pipe joint shown in FIG. 1.

Also, in the present embodiment, as shown in FIG. 5, at a lower face 23 of the flange 20 (a face opposed to the block 3), an projection portion 24 is formed. The projection portion 24 is formed at an area opposite to an area where the through hole 21 to which the fitting 10 is inserted, is formed with respect to a center axis of the insertion opening 22 to which the bolt 30 is inserted. The projection portion 24 is projected from other portion of the lower face 23 of the flange 20. As shown in FIG. 1, the projected portion 24 projects with a height L3 towards the block 3 from the other portion of the lower face 23 of the flange 20.

Further, in the present embodiment, an tip of the fitting 10 projects towards the block 3 side instead of a lower face 23 of the flange 20, as shown in FIG. 1, in a condition that the convex shape gap portion 12 is latched to the concave shape gap portion 21b.

Figure 6:
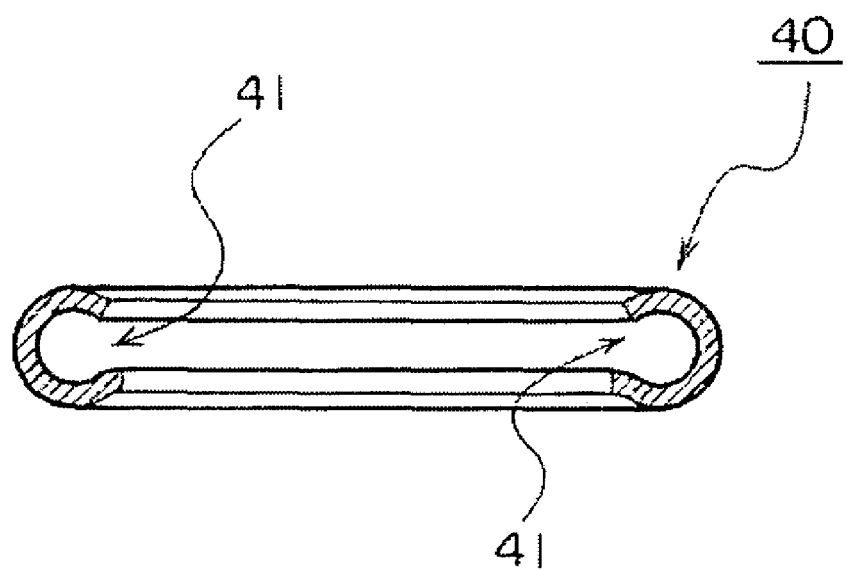
FIG. 6 is a vertical cross sectional view of a metal seal used for the pipe joint shown in FIG. 1.

The metal seal 40 is a ring member composed of a metal material, for example stainless-steel and the like. The metal seal 40 has "C" shaped cross section having an opening groove 41 at an inner circumference, as shown in FIG. 6. In the present embodiment, on a surface of the metal seal 40, a tinned layer is formed by electroplating. A thickness of the tinned layer is preferably 20 to 35 μm, thereby a damage such as an impression on a sealing face of the block 3 caused by the metal seal 40 can be prevented well particularly. As a specific method for forming the tinned layer, for example, a hanging plating method wherein metal seals are hanged singly at a shelf and dipped into a electroplating bath, a barrel plating method wherein a plurality of metal seals loaded into a barrel are put into a electroplating bath as a whole, can be exemplified.

In the present embodiment, it is possible to prevent leakage of high pressure gas, such as carbon dioxide gas which penetrates sealed portion, by using the metal seal 40 between the fitting 10 and the block 3. Also, according to making the "C" shaped cross section of the metal seal 40, it is available to seal certainly even with a small tightening force, since the tightening force by the bolt 30 is accumulated as a resilient repulsion force. Also, since the tightening force is small, a damage such as an impression on a sealing face of the block 3 given by the metal seal 40 can be prevented. Further, according to forming a tinned layer on a surface of the metal seal 40, the surface of the metal seal 40 can be softened to a moderate degree, and a damage given to the seal face of the block 3 with tightening the metal seal 40 can be prevented further.

As shown in FIG. 3, the metal seal 40 is pressingly inserted to a gripping portion 13a of the fitting 10 so as to face an opening groove 41 towards inside. According to adopting such arrangement, a high pressure carbon dioxide gas intrudes into an internal space of the "C" shape cross section to expand the cross section. Thereby, since a pressure of the gas acts to increase a surface pressure of the seal face, the sealing performance is improved.

As shown in FIG. 1, the block 3 of the present embodiment, a diameter of an opening portion 3c of a connection opening 3a is expanded so as to insert the metal seal 40 and the fitting 10. Further, at a circumference of the opening portion 3c, an annular groove 3d is formed to put in a second O-ring 60. According to sealing between the flange 20 and the block 3 by the second O-ring 60 intruded into the annular groove 3d, intrusion of water such as rainwater and the like between the fitting 10 and the block 3, which are composed by different materials, through an outer circumference face of the fitting 10 and the opening portion 3c is prevented.

Also, in the block 3, there is provided a bolt securing hole 3b having an internal thread to which the bolt 30, can be threaded. And by threading the bolt 30 which is inserted into the insertion opening 22 of the flange 20, with the bolt securing hole 3b, it is available to tightly fix the flange 20 with the block 3.

A method for connecting the hose 2 with the connection opening 3a of the block 3 of a compressor by using the above stated pipe joint 1 will be specified below;

Firstly, the metal seal 40 is pressingly inserted into the holding portion 13a formed at a tip end of the fitting 10, and the fitting 10 is joined with an end portion of the hose 2 so as to communicate a communication passage 11 in the hose 2. Then, the fitting 10 is inserted into the through hole 21 of the flange 20 from a lower side in FIG. 1, with a condition that the first O-ring 50 is intruded to the annular groove 21a of the through hole 21.

Next, the tip end of the fitting 10 and the metal seal 40 are inserted into the opening portion 3c of the connection opening 3a with a condition that the second O-ring 60 is intruded into the annular groove 3d formed in the block 3. Then, inserting the bolt 30 to the through hole 22 of the flange 20 and threading with the bolt securing hole 3b of the block 3, the flange 20 is tightly fixed to the block 3 by the bolt 30.

In the present embodiment, since the fitting 10 and the flange 20 are composed of different members individually and the fitting 10 is freely rotatable to the flange 20, it is possible to adjust the direction of the fitting 10 with a condition that the flange 20 is temporarily joined to the block 3. Thereby, operability is improved, since it is not necessary to predetermine a direction of the hose 2 to the flange 20.

At final tightening of the flange 20 to the block 3 by the bolt 30, a tightening force of the bolt 30 is intensively applied to the projection portion 24, since the projection portion 24 projects to the block 3 side at a facing surface 23 of the flange 20. Also, since the fitting 10 projects toward the block 3 at an opposite side with a central focus on the insertion opening 22, the tightening force is applied to the tip of the fitting 10 in a concentrated manner by the principle of leverage wherein the bolt 30 is a fulcrum. Thereby, the metal seal 40 can be compressed in parallel by tightening of one bolt 30, and an advanced installation function can be maintained.

Note that, as shown in FIG. 1, a tightening torque can be set arbitrarily by changing a ratio of a length L1 from a centerline of the through hole 21 to a centerline of the insertion opening 22 and a length L2 from a centerline of the projection portion 24 to a centerline of the insertion opening 22.

In the pipe joint assembled as above, contact portions of the fitting 10 and the block 3 are sealed by the first and the second O-rings 50 and 60. Thereby, the galvanic corrosion occurred by intrusion of water such as rainwater and the like between the fitting 10 and the block 3, composed of the different metallic materials, can be prevented.

Figure 7:
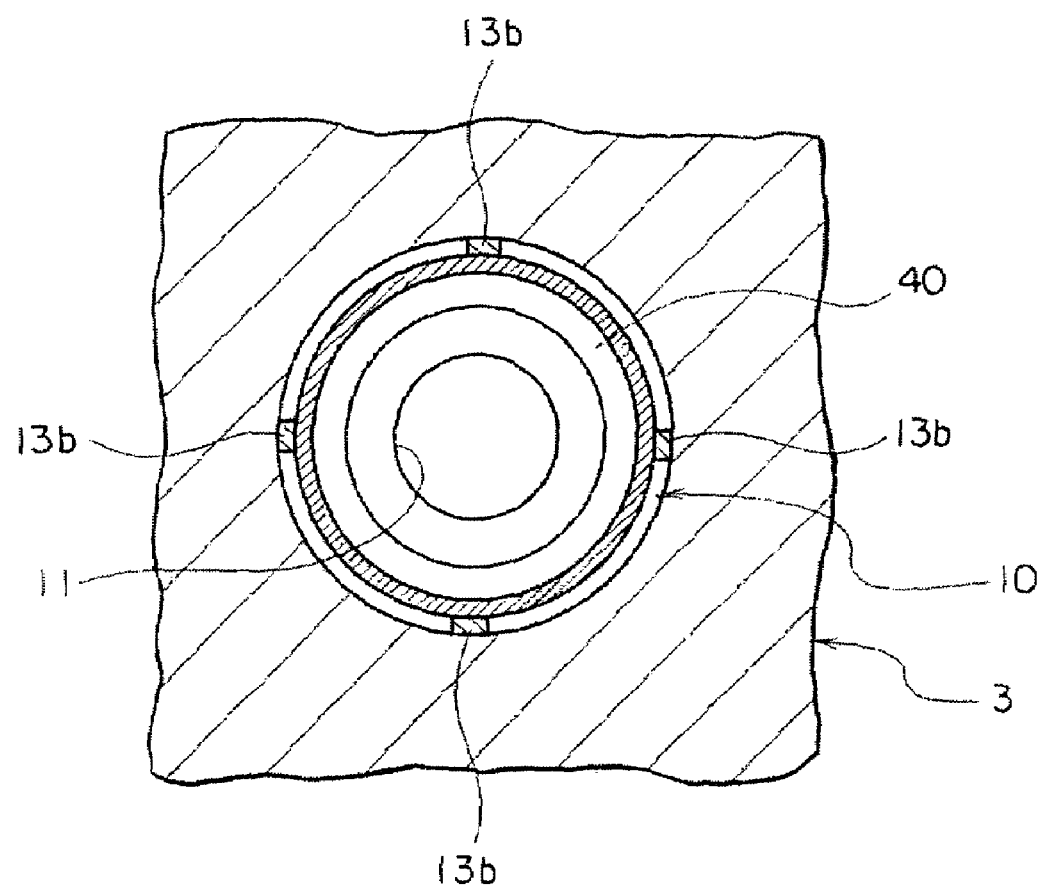
FIG. 7 is a transverse cross sectional view of a tip of fitting and a metal seal of a pipe joint according to a second embodiment of the present invention.

FIG. 7 is a transverse cross sectional view along the line IV-IV of FIG. 3 showing a tip of a fitting and a metal seal of a pipe joint according to a second embodiment of the present invention. In the second embodiment of the present invention, as with the holding portion 13a of the first embodiment, a holding portion 13b, wherein only an outer circumference portion projects toward the block 3, is formed at a tip of the fitting 10. The holding portion 13b in the second embodiment, as shown in FIG. 7, is not formed at whole circumference of the tip of the fitting 10, and is formed at only four directions of the outer circumference of the tip of the fitting 10 toward the block 3 which is different from the first embodiment. In this manner, by projecting the holding portion 13b partially, the metal seal 40 can easily be pressingly inserted to the holding portion.

Figure 8:
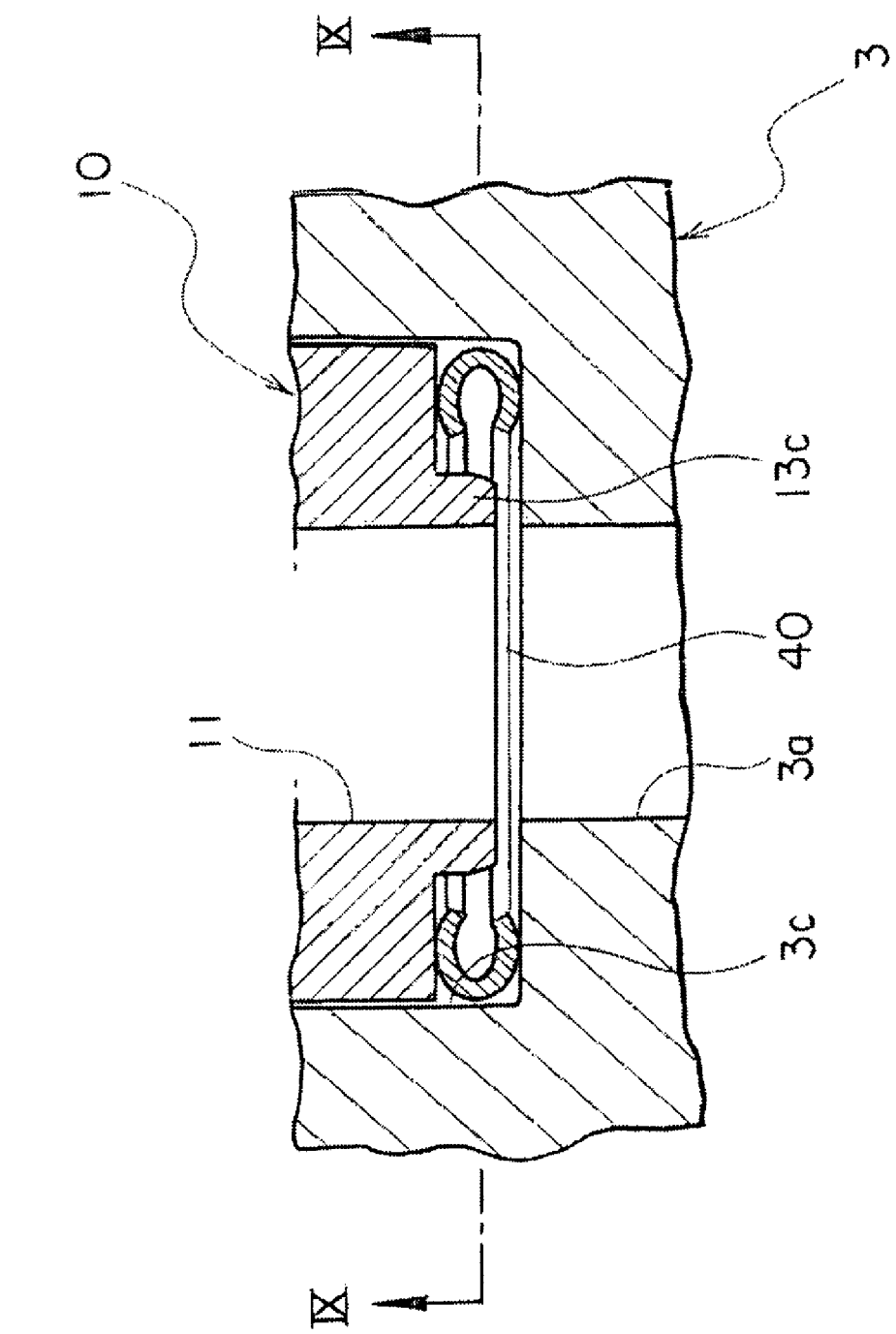
FIG. 8 is a vertical cross sectional view of a tip of fitting and a metal seal of a pipe joint according to a third embodiment of the present invention.
Figure 9:
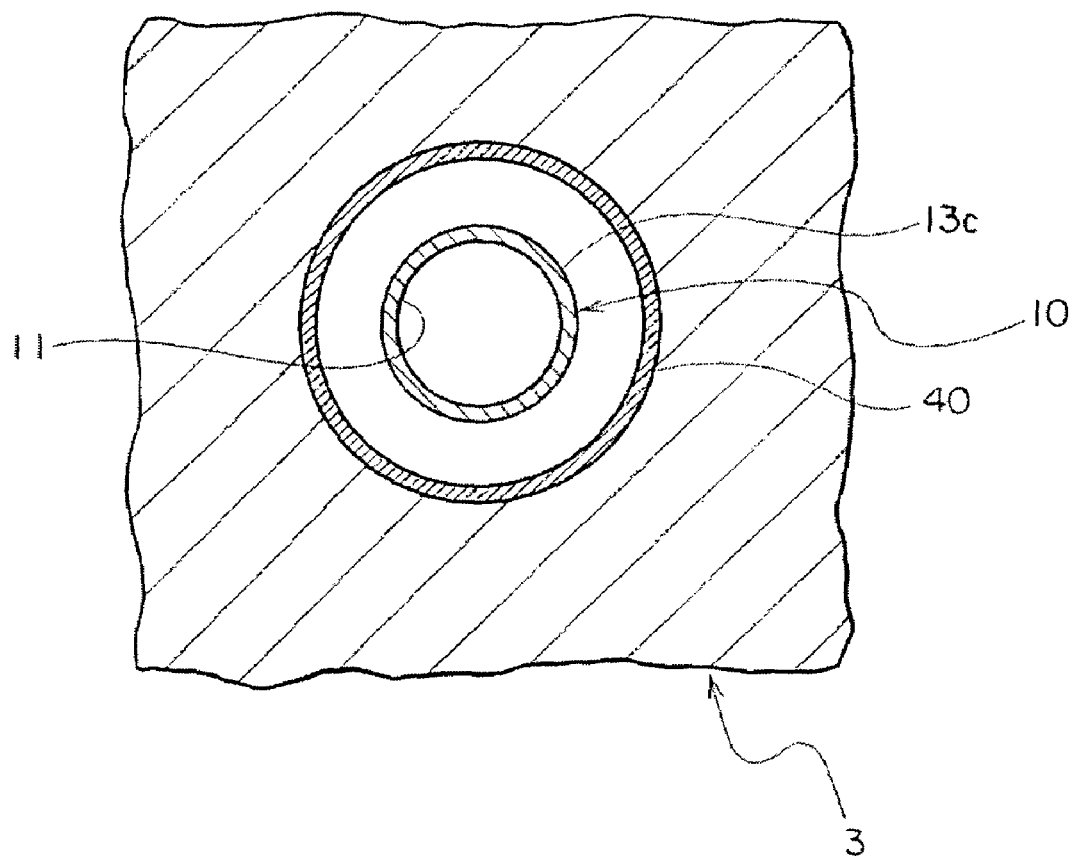
FIG. 9 is a transverse cross sectional view along a line IX-IX of FIG. 8.

FIG. 8 is a vertical cross sectional view showing a tip of a fitting and a metal seal of a pipe joint according to a third embodiment of the present embodiment, and FIG. 9 is a transverse sectional view along a line IX-IX of FIG. 8. As shown in FIG. 8 and FIG. 9, a holding portion 13c wherein only an inner circumference circularly projects toward the block 3, may be formed at the tip of the fitting 10. In the present embodiment, the holding portion 13c having a convex shape is pressingly inserted to an inner opening of the metal seal 40, and thereby fitting holds the metal seal 40.

Figure 10:
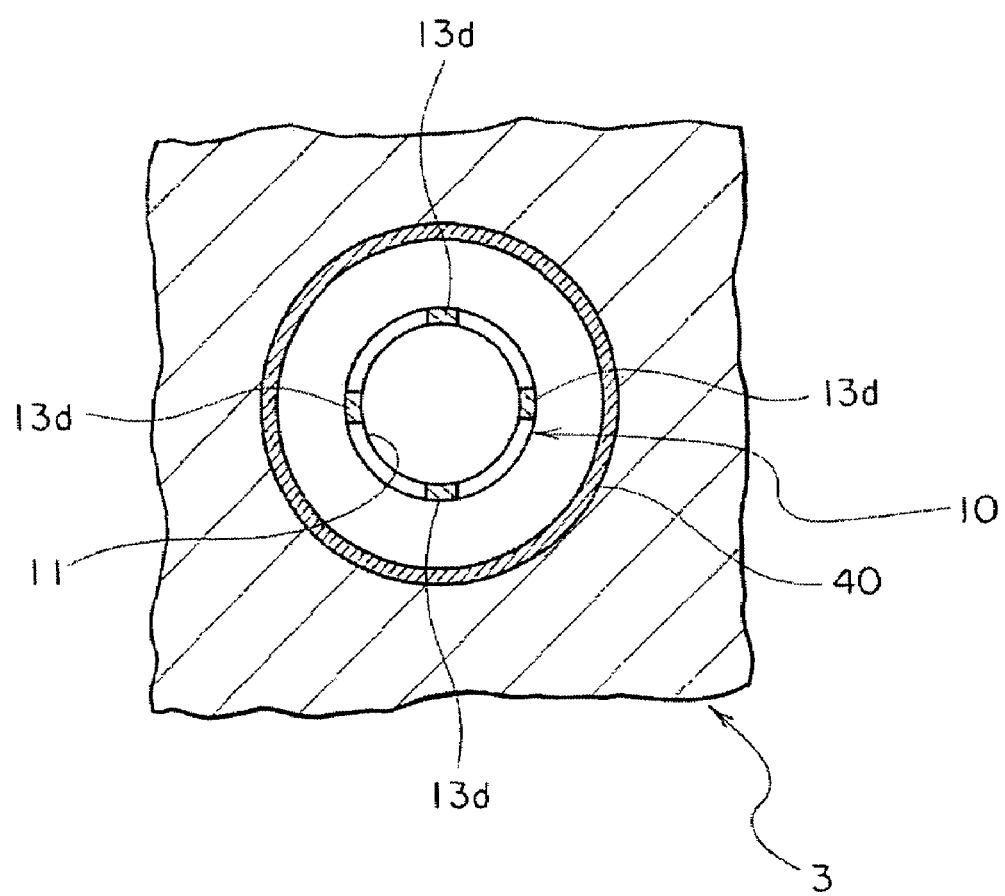
FIG. 10 is a transverse sectional view of a tip of fitting and a metal seal of a pipe joint according to a fourth embodiment of the present invention.

FIG. 10 is a transverse cross sectional view showing a tip of fitting and a metal seal of a pipe joint according to a fourth embodiment of the present invention and a cross sectional view along a line corresponding to the line IX-IX of FIG. 8. In the fourth embodiment of the present invention, as similar to the holding portion 13c in the third embodiment, a holding portion 13d is formed at a tip of the fitting 10, wherein an, inner circumference portion of the holding portion 13d projects only toward the block 3. The holding portion 13d in the fourth embodiment, as shown in FIG. 10, is not formed at whole circumference of the tip of the fitting 10, and is formed at only four directions of the inner circumference of the tip of the fitting 10 so as to project toward the block 3 which is different from the third embodiment. In this manner, by projecting the holding portion 13d partially, the metal seal 40 can easily be pressingly inserted to the holding portion.

Figure 11:
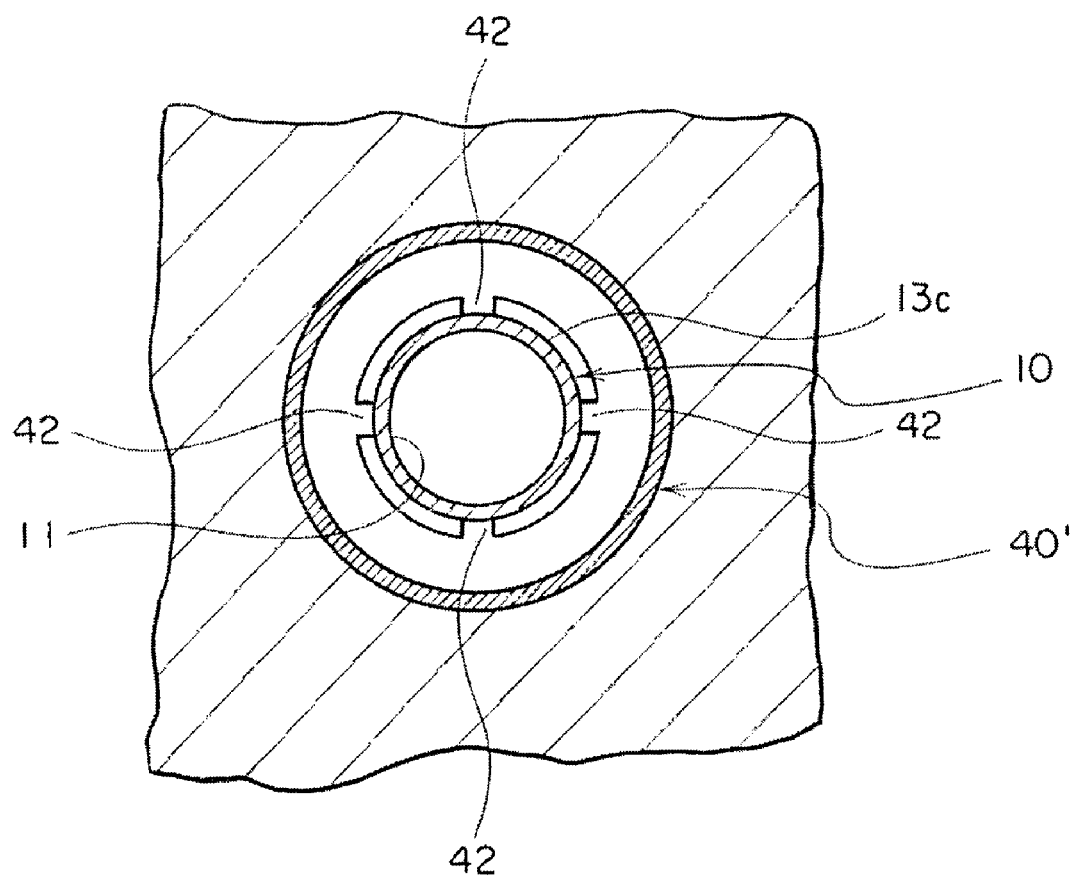
FIG. 11 is a transverse sectional view of a tip of fitting and a metal seal of a pipe joint according to fifth embodiment of the present invention.
Figure 12:
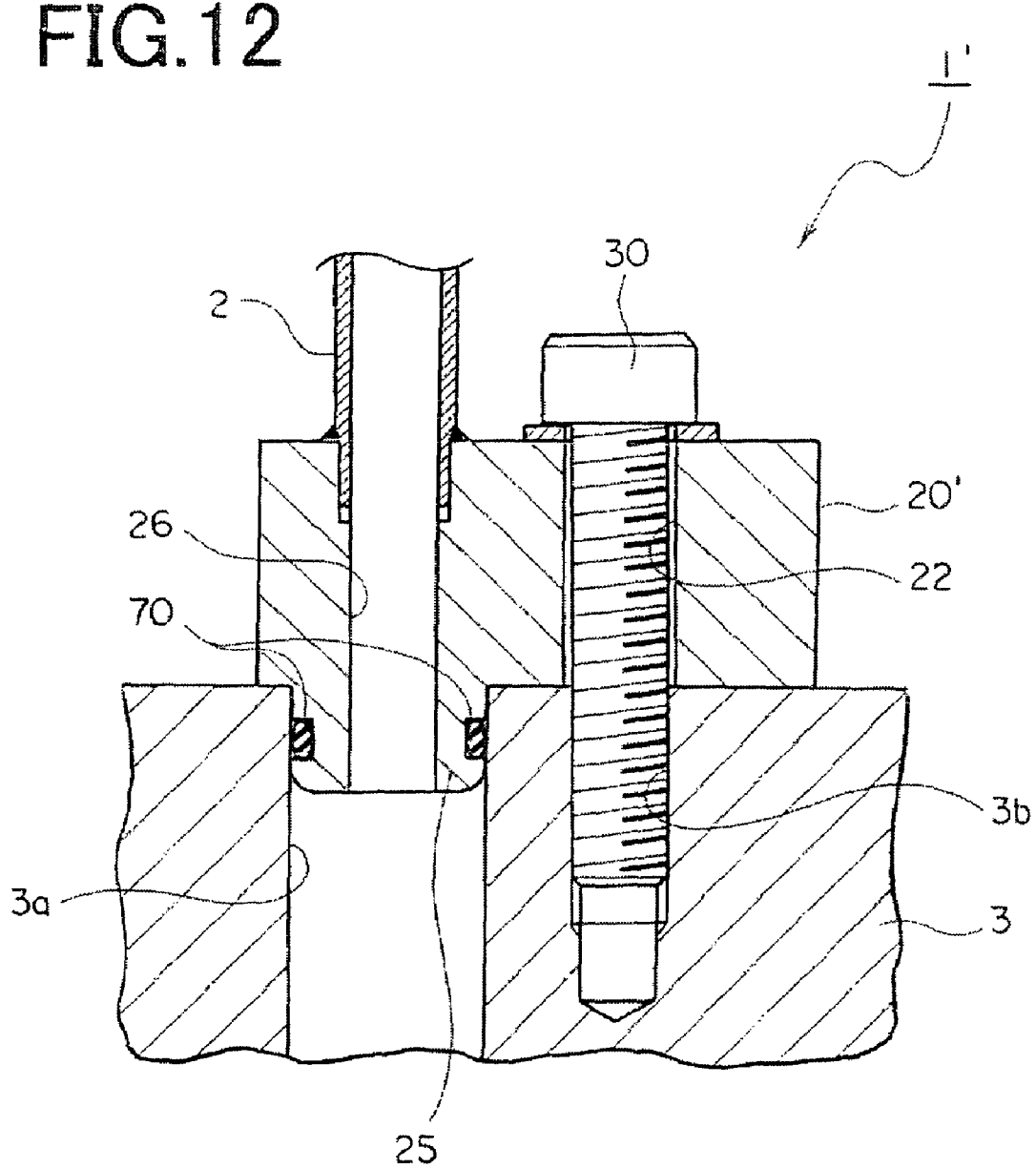
FIG. 12 is a vertical cross sectional view showing a conventional pipe joint.

FIG. 11 is a transverse cross sectional view showing a tip of a fitting and a metal seal of a pipe joint according to a fifth embodiment of the present invention, and is a cross sectional view along a line corresponding to the line IX-IX of FIG. 8. In the fifth embodiment of the present invention, a holding portion 13c is formed at a tip of the fitting 10, wherein an inner circumference portion of the holding portion 13c circularly projects only toward the block 3. This is similar to the third embodiment, however, a protruding portion 42 projects toward the holding portion 13c is formed at an inner circumference face of the metal seal 40' which is different from the third embodiment. As the metal seal 40' partially contacts with the holding portion 13c at the protrusion portion 42 only, the metal seal 40 can easily be pressingly inserted to the holding portion.

Note that the above mentioned embodiments are described for easily understanding the present invention and are not described to limit the present invention. Accordingly, the respective elements disclosed in the above embodiments are intended to cover various modifications and equivalent arrangements included in the scope of the present invention.

INDUSTRIAL APPLICABILITY

A pipe joint of the present invention is useful as a pipe joint for connecting a hose for supplying a refrigerant to various equipments such as compressors, evaporators and the like, in a car air conditioner. A pipe joint of the present invention is also useful as a pipe joint for connecting pipes and equipments in a fuel cell treating hydrogen gas having high permeation property.

The invention claimed is:

1. A pipe joint for connecting a pipe with a connection opening of a body to be connected comprising;
   a fitting connected to an end portion of the pipe and provided with a communication passage communicating into the pipe;
   a flange having a through hole into which said fitting is available to be inserted, and said flange pressingly holding said fitting inserted into said through hole towards said body;
   a tightening means for fixing tightly said flange to said body;
   a metal seal provided between said fitting and said body so as to seal a joined portion of said communication passage and said connection opening externally, and;
   an O-ring for sealing a connecting portion of said fitting and said body externally; wherein,
   said metal seal is composed of a ring member having "C" shaped cross section, which includes an opening groove in an inner circumference;
   said O-ring comprises a first O-ring provided between said fitting and said flange, and
   a second O-ring provided between said flange and said body;
   an insertion opening is formed in said flange for inserting said tightening means;
   a projecting portion is formed on a face of said flange which is opposed to said body, said projecting portion is formed at an area opposite to an area where said insertion opening is formed with respect to a center axis of said insertion opening, said projection portion projects from other portion of said flange towards said body; and
   a tip of said fitting inserted into said through hole projects towards said body from said face of said flange.

2. The pipe joint according to claim 1, wherein said metal seal is tin plated on its surface.

3. The pipe joint according to claim 1 or 2, wherein a holding portion having a concave shape or a convex shape available to hold said metal seal, is formed on a tip of said fitting.

* * * * *